G. MULLER.
FASTENER.
APPLICATION FILED JULY 12, 1916.
1,219,415.
Patented Mar. 13, 1917.
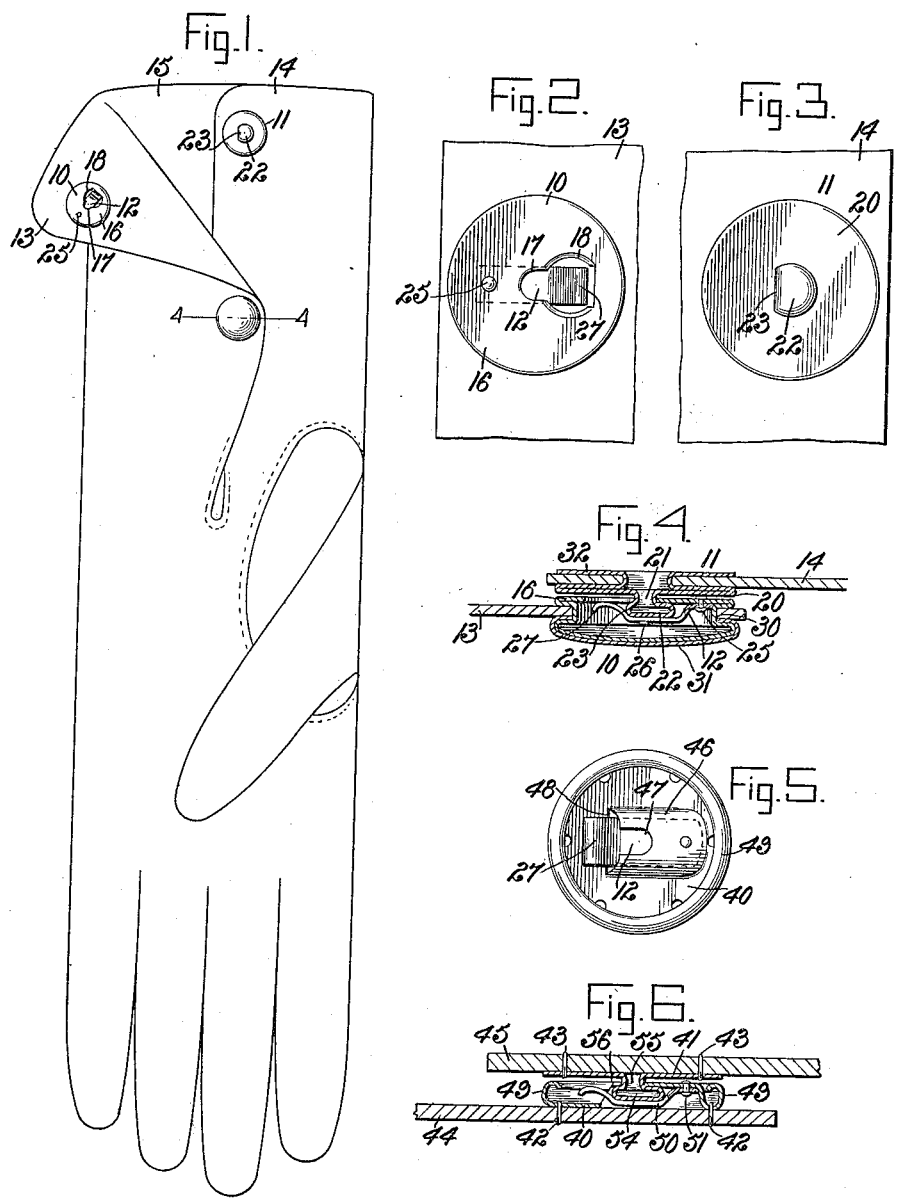

UNITED STATES PATENT OFFICE.

GEORGE MULLER, OF RIDGEWOOD, NEW JERSEY.

FASTENER.

1,219,415.

Specification of Letters Patent.

Patented Mar. 13, 1917.

Application filed July 12, 1916. Serial No. 108,766.

*To all whom it may concern:*

Be it known that I, GEORGE MULLER, a citizen of the United States, and a resident of Ridgewood, in the county of Bergen and State of New Jersey, have invented a new and Improved Fastener, of which the following is a full, clear, and exact description.

The invention relates to fasteners of the socket and stud type, and its object is to provide a new and improved fastener which is simple and durable in construction, capable of being safely used on gloves and other articles, even if the latter are made of very delicate materials, and arranged to permit the user to conveniently close or open the fastener without danger of tearing the materials to which the fastener members are attached. In order to produce the desired result use is made of a socket member, a stud member and a retaining means, the said socket member having a socket provided with a sidewise extending entrance, the said retaining means being yieldingly mounted on the said socket member and extending into the said entrance, and the said stud members having a stud provided with a head adapted to be engaged with the said yielding retaining means to move the latter out of the entrance and to permit slipping the stud member into the socket in the rear of the said retaining means to hold the stud member locked in position in the socket member.

A practical embodiment of the invention is represented in the accompanying drawings forming a part of this specification, in which similar characters of reference indicate corresponding parts in all the views.

Figure 1 is a plan view of the fastener as applied to a glove, one wrist flap of which is shown folded back;

Fig. 2 is an enlarged face view of the socket member as applied;

Fig. 3 is a similar view of the stud member as applied;

Fig. 4 is an enlarged sectional side elevation of the fastener on the line 4—4 of Fig. 1;

Fig. 5 is an enlarged plan view of a modified form of the socket member and retaining means; and Fig. 6 is a sectional side elevation of a modified form of the fastener provided with the socket member shown in Fig. 5.

The fastener illustrated in Figs. 1, 2, 3 and 4 consists essentially of a socket member 10, a stud member 11 and a retaining means in the form of a spring 12 attached to the socket member 10. The members 10 and 11 are attached to the parts 13 and 14 to be fastened together, the said parts 13 and 14, as shown in Fig. 1, forming the wrist flaps of a glove 15, but it is expressly understood that I do not limit myself to this particular application of the fastener. The socket member 10 is provided with a flat face 16 having a central opening 17 terminating at one side in an enlarged entrance 18, as plainly shown in Figs. 1 and 2. The stud member 11 is provided with a face plate 20 on which is centrally struck up a stud 21 having a head 22 flattened on one side as indicated at 23. The spring 12 is fastened at one end by a rivet 25 or other fastening means to the under side of the face plate 16 of the socket member 10, and the said spring has a curved portion 26 intermediate its ends for engagement with the face of the head 22 of the stud 21. The terminal of the spring 12 is in the form of a retaining means 27 located at the entrance 18 of the socket opening 17. When it is desired to connect the members 10 and 11 with each other then the head 22 of the stud 21 is adapted to engage the retaining means 27 to press the spring 12 inward and to allow the head 22 to pass through the entrance 18 into the socket member to be finally slipped sidewise with its stud 21 into engagement with the socket opening 17. When this takes place, the spring 12 returns to its normal position, that is, the retaining means 27 snap in behind the flat side 23 of the head 22 thus locking the stud member in position in the socket member. It will be noticed that by the arrangement described, the head 22 abuts against the under side of the face plate 16 and is held securely in this position by the action of the spring 12 so that the members 10 and 11 of the fastener are securely locked together. When it is desired to disconnect the members 10 and 11, it is only necessary to slide the same slightly sidewise in opposite directions to cause the head 22 to act on the retaining means 27 to force the spring inward and thus allow the head 22 to pass into the entrance end 18 and out of the same thus disconnecting the members 10 and 11. It will be noticed that by the arrangement described very little, if any, strain is exerted on the parts 13 and 14, as the movement of the members 10 and 11 toward or from each other is in a sidewise direction and the members are not pulled apart as practised in the ordinary fasteners now generally used.

In the construction shown in Figs. 1, 2, 3 and 4, the face plate 16 of the socket member 10 is provided with an eyelet portion 30 for fastening the said member to the part 13, and this eyelet portion is preferably ornamented with a suitable head 31 to enhance the appearance of the glove fastener. The plate 20 of the stud member 11 is provided with an eyelet 32 for attaching the stud member to the part 14.

In the modified form shown in Figs. 5 and 6, use is made of a socket member 40 and a stud member 41 fastened by stitches 42 and 43 to the respective parts 44 and 45 to be connected with each other. In this case the socket member 40 is in the form of a plate or a disk having a struck-up socket 46 provided with a central opening 47 leading to an enlarged entrance 48. The edge of the plate 40 is turned up to form an annular bead 49, the top of which extends in a plane in the top of the socket 46, as will be readily understood by reference to Fig. 6. The spring 50 is similar in construction to the spring 12 above described in reference to the fastener illustrated in Figs. 1, 2, 3 and 4, and this spring is adapted to be engaged by the head 54 of the stud 55 struck up centrally on the stud member 41. The operation in closing and opening the members 40 and 41 is the same as above described in reference to the members 10 and 11, it being understood that in this case the head 54 slips into the raised socket 46 and is held therein by the free end of the spring 50 engaging the flat side 56 of the head 54.

The fastener shown and described is very simple and durable in construction and can be cheaply manufactured and readily applied to various parts to be fastened together even if such parts are made of very delicate materials.

Having thus described my invention, I claim as new and desire to secure by Letters Patent:

1. A fastener, comprising a socket member, a stud member and a retaining spring, the said socket member being in the form of a disk having a struck-up socket provided with a central opening leading to an enlarged entrance, the said retaining spring being secured at one end to the under side of the said struck-up socket at a point diametrically opposite the said enlarged socket entrance, the said retaining spring being bent downward and being provided at its free end with a retaining means projecting into the said entrance, the said stud member having a stud provided with a head adapted to be engaged with the said retaining means to press the spring and to slip sidewise through the entrance into the socket, the said stud head snapping in behind the said spring retaining means to hold the stud member locked in position in the socket member.

2. A fastener, comprising a socket member, a stud member and a retaining spring, the said socket member being in the form of a disk having a struck-up socket provided with a central opening leading to an enlarged entrance, the said disk having a turned annular head at its edge, the top of which extends in a plane with the top of the said socket, the said retaining spring being secured at one end to the under side of the said struck-up socket at a point diametrically opposite the said enlarged socket entrance, the said retaining spring being bent downward and being provided at its free end with a retaining means projecting into the said entrance, the said stud member having a stud provided with a head adapted to be engaged with the said retaining means to press the spring and to slip sidewise through the entrance into the socket, the said stud head snapping in behind the said spring retaining means to hold the stud member locked in position in the socket member.

3. A fastener, comprising a socket member, a stud member and a retaining spring, the said socket member having a socket provided with a sidewise extending enlarged entrance, the said retaining spring being attached to the under side of the socket member and being provided at its free end with a retaining means projecting into the said entrance and extending across the same, the said stud member having a stud provided with a head flattened at one side, the said head being adapted to be engaged with the said retaining means to press the spring and to slip sidewise through the said entrance into the socket, the said stud head snapping with its flat side in behind the said spring retaining means to hold the stud member locked in position in the socket member.

GEORGE MULLER.

Copies of this patent may be obtained for five cents each, by addressing the "Commissioner of Patents, Washington, D. C."